(12) United States Patent
Amaki et al.

(10) Patent No.: US 11,526,301 B2
(45) Date of Patent: Dec. 13, 2022

(54) MEMORY SYSTEM AND NON-VOLATILE MEMORY CONTROL METHOD

(71) Applicant: Kioxia Corporation, Minato-ku (JP)

(72) Inventors: Takehiko Amaki, Yokohama (JP); Yoshihisa Kojima, Kawasaki (JP)

(73) Assignee: Kioxia Corporation, Minato-ku (JP)

( * ) Notice: Subject to any disclaimer, the term of this patent is extended or adjusted under 35 U.S.C. 154(b) by 96 days.

(21) Appl. No.: 16/751,262

(22) Filed: Jan. 24, 2020

(65) Prior Publication Data
US 2020/0293228 A1  Sep. 17, 2020

(30) Foreign Application Priority Data
Mar. 11, 2019 (JP) .............................. JP2019-043956

(51) Int. Cl.
*G11C 29/00* (2006.01)
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/0679* (2013.01); *G06F 11/1068* (2013.01)

(58) Field of Classification Search
CPC .... G06F 3/0604; G06F 3/0616; G06F 3/0659; G06F 3/0679; G06F 11/1048; G06F 11/1068; G11C 7/04; G11C 11/5628; G11C 16/0483; G11C 16/08; G11C 16/10; G11C 16/26; G11C 16/32; G11C 16/3495; G11C 2211/5648
See application file for complete search history.

(56) References Cited

U.S. PATENT DOCUMENTS

| | | | |
|---|---|---|---|
| 7,652,929 B2 | 1/2010 | Li | |
| 9,454,420 B1 * | 9/2016 | Tai | ................ G06F 11/073 |
| 9,836,219 B2 * | 12/2017 | Kim | ................ G11C 29/52 |
| 2009/0319859 A1 * | 12/2009 | Alrod | ................ G06F 11/1068 |
| | | | 714/752 |
| 2010/0162081 A1 * | 6/2010 | Joo | ................ G06F 12/0246 |
| | | | 714/763 |
| 2012/0166913 A1 | 6/2012 | Alrod et al. | |
| 2012/0182813 A1 | 7/2012 | Minamoto | |
| 2012/0320671 A1 * | 12/2012 | Meir | ................ G11C 13/0061 |
| | | | 365/185.03 |
| 2013/0080858 A1 * | 3/2013 | Lee | ................ G11C 16/349 |
| | | | 714/773 |
| 2014/0223246 A1 * | 8/2014 | Kim | ................ G11C 16/349 |
| | | | 714/718 |

(Continued)

FOREIGN PATENT DOCUMENTS

| | | | |
|---|---|---|---|
| JP | 2010-539631 A | 12/2010 |
| JP | 2019-168853 A | 10/2019 |

*Primary Examiner* — Albert Decady
*Assistant Examiner* — Enamul M Kabir
(74) *Attorney, Agent, or Firm* — Oblon, McClelland, Maier & Neustadt, L.L.P.

(57) ABSTRACT

According to one embodiment, there is provided a memory system including a non-volatile memory, and a controller. The controller selects one read method from a plurality of read methods with different time required to perform a read operation on the non-volatile memory and issues a first read command according to the selected one read method to the non-volatile memory.

20 Claims, 12 Drawing Sheets

(56) References Cited

U.S. PATENT DOCUMENTS

| | | | |
|---|---|---|---|
| 2014/0380122 A1* | 12/2014 | Myung | G06F 11/1008 |
| | | | 714/764 |
| 2016/0034349 A1* | 2/2016 | Choi | G11C 29/26 |
| | | | 714/764 |
| 2016/0266817 A1* | 9/2016 | Kamimura | G06F 3/064 |
| 2017/0364298 A1* | 12/2017 | Choi | G06F 11/076 |
| 2018/0350446 A1* | 12/2018 | K | G11C 29/76 |
| 2018/0357013 A1* | 12/2018 | Shi | G06F 12/0246 |
| 2019/0068222 A1* | 2/2019 | Lee | H03M 13/1128 |
| 2019/0295665 A1* | 9/2019 | Kojima | G11C 16/10 |

* cited by examiner

FIG.5

| | READ METHOD | tRead | BER | RETRY RATIO |
|---|---|---|---|---|
| INITIAL READ | Fast Read | T1 | ER1 | RR1 |
| | Normal Read | T2 (>T1) | ER2 (<ER1) | RR2 (<RR1) |
| | DLA read | T3 (>T2) | ER3 (<ER2) | RR3 (<RR2) |
| RETRY READ | Vth Tracking | T4 (>>T3) | ER4 (<ER3) | RR4 (<RR3) |

FIG.8

| Chip# | Block# | NUMBER OF READ CLUSTERS | NUMBER OF RETRY-OCCURRED CLUSTERS | RETRY RATIO |
|---|---|---|---|---|
| 0 | 100 | 1,000 | 1 | 0.1% |
| 0 | 200 | 5,000 | 10 | 0.2% |
| 0 | 400 | 1 | 1 | 100% |
| 4 | 200 | 400 | 0 | <0.25% |
| 7 | 450 | 4,000 | 70 | 1.925% |

ME MORY SYSTEM AND NON-VOLATILE
MEMORY CONTROL METHOD

CROSS-REFERENCE TO RELATED
APPLICATIONS

This application is based upon and claims the benefit of priority from Japanese Patent Application No. 2019-043956, filed on Mar. 11, 2019; the entire contents of which are incorporated herein by reference.

FIELD

Embodiments described herein relate generally to a memory system and a memory system control method.

BACKGROUND

In a memory system that includes a non-volatile memory such as a NAND-type flash memory, a processing of writing and erasing data in or from a memory cell in the non-volatile memory is performed in a manner in which an electron is injected and emitted into and from a charge storage film by applying a high voltage between a channel region and a control gate. When the processing of writing and erasing data in and from the memory cell is performed multiple times, an insulating film around the charge storage film might deteriorate. At this time, it is desired to appropriately maintain a reliability of a read operation on the non-volatile memory.

BRIEF DESCRIPTION OF THE DRAWINGS

FIG. 5 is a diagram illustrating characteristics of a plurality of read methods according to the embodiment;

FIG. 8 is a diagram illustrating a data structure of wear information according to the embodiment;

DETAILED DESCRIPTION

Figure 1:
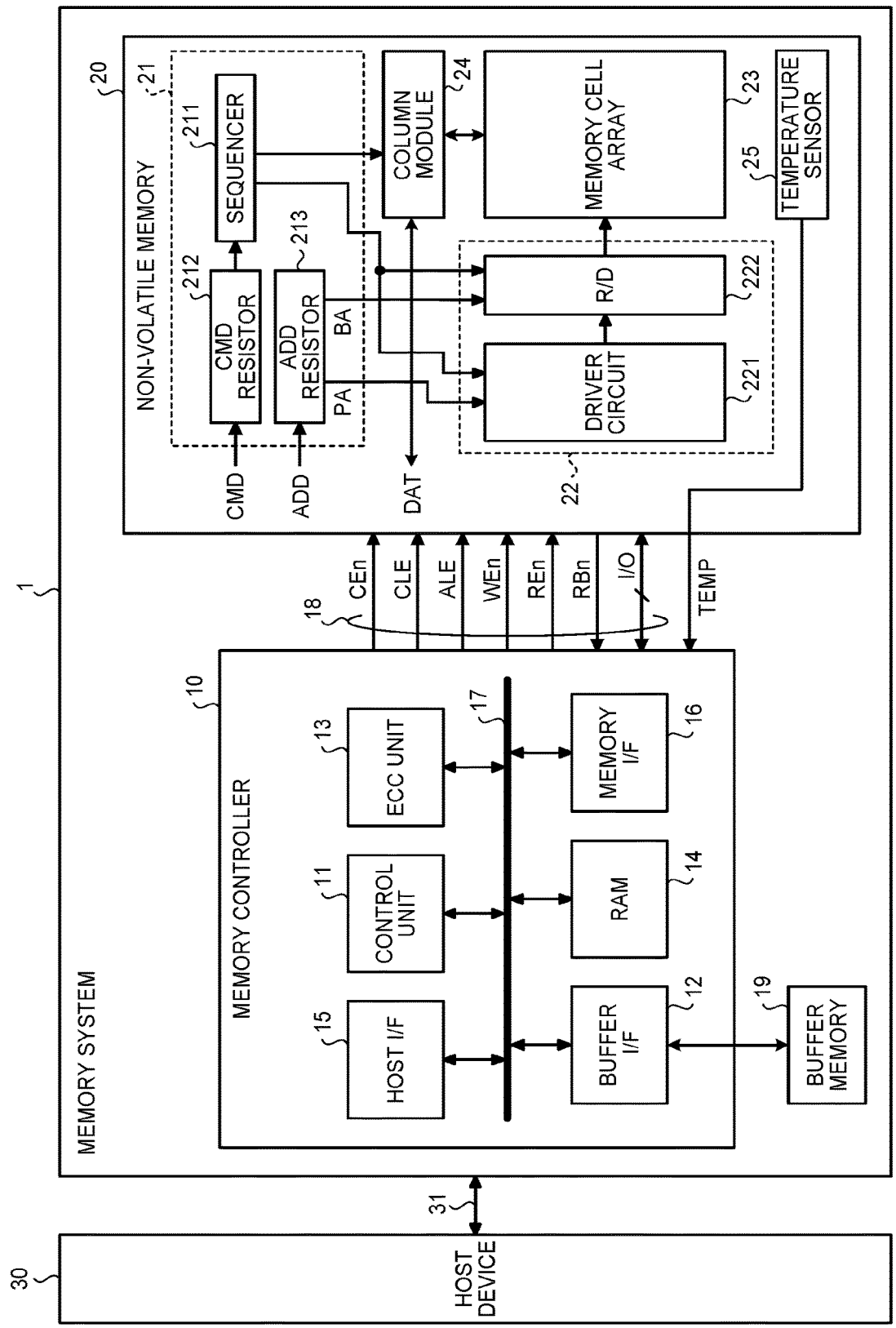
FIG. 1 is a diagram illustrating a configuration of a memory system according to an embodiment.

In general, according to one embodiment, there is provided a memory system including a non-volatile memory, and a controller. The controller is configured to select one read method from a plurality of read methods with different time required to perform a read operation on the non-volatile memory and issue a first read command according to the selected one read method to the non-volatile memory.

Embodiments of a memory system will be explained below in detail with reference to the accompanying drawings. The present invention is not limited to the following embodiments.

Embodiment

A memory system according to an embodiment includes a non-volatile memory such as a NAND-type flash memory. The non-volatile memory includes a plurality of memory cells. In the memory system, a processing of writing and erasing data in and from a memory cell in the non-volatile memory is performed in a manner in which an electron is injected and emitted into and from a charge storage film by applying a high voltage between a channel region and a control gate. When the processing of writing and erasing data in and from the memory cell is performed multiple times, an insulating film around the charge storage film might deteriorate. At this time, it is desired to appropriately maintain a reliability of a read operation on the non-volatile memory.

A plurality of read methods which are different from each other in regard to a time required to perform the read operation is available. In the plurality of read methods, a trade-off relation exists between performance and reliability. For example, in the plurality of read methods, a bit error ratio BER tends to be decreased as a read time tRead required for the read operation is increased. For this reason, in a case of selecting a read method with an excessively high reliability in comparison to a reliability required for a current wear state, performance might unnecessarily be decreased (for example, an increase in read time tRead). In addition, in a case of attempting to increase the performance excessively (for example, selecting a read method with a short read time tRead), since a read method with a lower reliability in comparison to a reliability required for a current wear state is selected, the reliability of the read operation might be decreased.

At this time, a wear state of each memory cell may be roughly estimated based on the number of writing and erasure of data in and from each of a plurality of management units in the non-volatile memory to properly select the plurality of read methods. Here, in a case where there is a gap between a result of the estimation and an actual wear state of each memory cell, it might be difficult to select an appropriate read method and appropriately maintain a reliability of the read operation.

Therefore, according to the present embodiment, in the memory system, a controller executes a read command for an examination with respect to the non-volatile memory, selects a read method according to a result of the execution, and issues, to the non-volatile memory, a read command for an outstanding read processing according to the selected read method, thereby seeking to appropriately maintain the reliability of the read operation.

Specifically, the controller issues, to the non-volatile memory, an examination read command for examining the wear state as the read command for an examination before performing the outstanding read processing. The examination read command is executed on a region of the non-volatile memory in which the outstanding read processing is likely to be performed.

At this time, the wear state of each memory cell in the non-volatile memory might be changed mainly due to stress associated with the number of times of writing and stress associated with an elapsed time after writing. The controller issues the examination read command within a predetermined time (for example, within tens of minutes to hours) after a write operation on a predetermined unit (for example, a word line or a block)is completed, in order to make an examination condition uniform for each block.

As a result, practically, it is possible to eliminate the stress associated with the elapsed time after the writing and examine the wear state due to the stress associated only with the number of times of writing, and it is possible to efficiently perform the examination for each physical block (each block), which is a unit of erasing data in the non-volatile memory. In other words, the examination condition can be uniform for each block and an examination result of a representative memory cell obtained by using the examination read command can also be used for another memory cell. Therefore, it is possible to efficiently perform the examination while reducing a frequency of issuance of an examination read command.

In addition, in a case where the amount of the stress associated with the number of times of writing varies for each block, the examination read command is issued to directly check characteristics representing a reliability of read data (for example, a retry ratio, an error bit rate, and the like), thereby making it possible to more accurately check the wear state of the memory cell, in comparison to a case of checking the number of times of writing and estimating characteristics representing the reliability relying on the checked number of times of writing. As a result, it is possible to select a more appropriate read method according to an actual wear state of the memory cell, easily improve both of performance and a reliability, and improve overall read performance in terms of both the performance and the reliability. In other words, it is possible to appropriately maintain the reliability of the read operation.

It should be noted that the stress associated with the number of times of writing includes, for example, program disturb (PD).

The PD is information indicating stress generated at the time of performing a write processing. For example, the PD includes information indicating whether writing of data in a block that includes a page specified in a corresponding physical address is completed. In a case where the writing of data in the block is in progress, the reliability of reading of data from, for example, a region in the vicinity of the last written page of the block is decreased in some cases. In the PD, a writing state of one or more word lines adjacent to a word line to be read may be used, instead of a writing state of the entire block that includes the valid line to be read.

Further, the stress associated with the elapsed time after the writing includes, for example, data retention (DR), read disturb (RD), and temperature crossover (TempX).

The DR is information indicating a data retention characteristic. For example, the DR includes an elapsed time for which data is retained after the data is written in a corresponding physical address. It should be noted that the elapsed time may be an actual time, or may be a value obtained by converting the actual time in consideration of a temperature or a degree of wear of a memory cell. For example, the higher the temperature in a retention state is, the longer the substantial elapsed time (an elapsed time converted from an actual time in consideration of an amount of stress caused during the retention) is. Further, the higher the degree of wear of the memory cell is, the longer the substantial elapsed time is (that is, the larger the amount of stress caused during the retention).

The RD is information indicating stress generated at the time of performing a read processing. For example, the RD includes the number of times of reading performed after writing data in a block that includes the page specified in a corresponding physical address.

The TempX is information indicating temperature stress. For example, the TempX includes information indicating a difference (temperature crossover) between a temperature when data to be read are written and a current temperature (e.g., temperature when the data is read) or the latest temperature sensed by a temperature sensor 25 to be described later.

A memory system 1 may be configured as illustrated in FIG. 1. FIG. 1 is a diagram illustrating a configuration of the memory system 1.

The memory system 1 includes a non-volatile memory 20, a memory controller 10, and a buffer memory 19. The memory system 1 can be connected to a host device 30, and a state in which the memory system 1 and the host device 30 are connected to each other is illustrated in FIG. 1. Examples of the host device 30 may include an electronic device such as a personal computer, a server device, a mobile terminal, and a digital still camera.

The memory system 1 may be various memory systems that includes a non-volatile memory, such as a solid state drive (SSD), and a memory card in which the memory controller and the non-volatile memory are integrated as one package.

The non-volatile memory 20 is a non-volatile memory which stores data in a non-volatile manner. For example, the non-volatile memory 20 is a NAND-type flash memory (hereinafter, simply referred to as a NAND memory). In the following description, a case where the NAND memory is used as the non-volatile memory 20 is illustrated. However, a storage medium other than the NAND memory, such as a three-dimensional flash memory, a resistive random access memory (ReRAM), a ferroelectric random access memory (FeRAM), a magnetoresistive random access memory (MRAM), or the like may also be used as the non-volatile memory 20. In addition, it is not essential that the non-volatile memory 20 is a semiconductor memory, and the present embodiment may also be applied to various storage media other than the semiconductor memory.

The memory controller 10 is, for example, a semiconductor integrated circuit configured in a form of a system-on-a-chip (SoC). A part or all of operations of respective components of the memory controller 10 to be described below may be implemented by a central processing unit (CPU) executing firmware, or may be implemented by hardware.

The memory controller 10 is connected to the non-volatile memory 20 by a memory bus 18, and is connected to the host device 30 through a host bus 31. The memory controller 10 controls a write processing on the non-volatile memory 20 according to a host write command from the host device 30. In addition, the memory controller 10 controls a read processing on the non-volatile memory 20 according to a host read command from the host device 30. As a protocol to which the host bus 31 conforms, any protocol such as serial advanced technology attachment (SATA), serial attached SCSI (SAS), and peripheral component interconnect express (PCIe) (registered trademark) (including non-volatile memory (NVM) express (registered trademark))may be employed.

The memory bus 18 performs transmission and reception of a signal using a memory interface connecting the memory controller 10 and the non-volatile memory 20 to each other. In a case where the memory interface is a s NAND interface, specific examples of the signal may include a chip enable signal CEn, a command latch enable signal CLE, an address latch enable signal ALE, a write enable signal WEn, a read enable signal REn, a ready/busy signal RBn, an input-and-output signal I/O, and the like.

The signal CEn is a signal for enabling the non-volatile memory 20. The signal CLE is a signal notifying the non-volatile memory 20 of the fact that an input signal I/O transmitted to the non-volatile memory 20 is a command. The signal ALE is a signal notifying the non-volatile memory 20 of the fact that an input signal I/O transmitted to the non-volatile memory 20 is an address. The signal WEn is a signal for making the non-volatile memory 20 store the input signal I/O therein. The signal REn is a signal for reading an output signal I/O from the non-volatile memory 20. The ready/busy signal RBn is a signal indicating whether the non-volatile memory 20 is in a ready state (a state in which the non-volatile memory 20 can receive a command from the memory controller 10) or a busy state (a state in which the non-volatile memory 20 cannot receive a command from the memory controller 10). The input-and-output signal I/O is, for example, an 8-bit signal. The input-and-output signal I/O is a substance of data transmitted and received between the non-volatile memory 20 and the memory controller 10, and includes a command, an address, write data (data to be written to the non-volatile memory 20), read data (data that are read from the non-volatile memory 20), or the like.

In addition, a signal TEMP indicating a temperature sensed by the temperature sensor 25 which senses a temperature of the non-volatile memory 20 is also input from the non-volatile memory 20 to the memory controller 10. As illustrated in FIG. 1, the temperature sensor 25 may be provided in the non-volatile memory 20 or may be an independent component provided outside the non-volatile memory 20. A signal line through which the signal TEMP output from the temperature sensor 25 is transmitted may be included in the memory bus 18 or may be independent from the memory bus 18.

The memory controller 10 includes a host interface (host I/F) 15, a control unit 11, a buffer interface (buffer I/F) 12, a random access memory (RAM) 14, a memory interface (memory I/F) 16, and an ECC unit 13. The host I/F 15, the control unit 11, the buffer I/F 12, the RAM 14, the memory I/F 16, and the ECC unit 13 are connected to one another through an internal bus 17.

The host I/F 15 is connected to the host device 30 through the host bus 31, and transmits a command and data received from the host device 30 to the control unit 11 and the RAM 14, respectively. Further, the host I/F 15 transmits data in the RAM 14 to the host device 30 in response to a request from the control unit 11.

The control unit 11 is implemented by, for example, a central processing unit (CPU) or the like, and controls an operation of each component of the memory controller 10. For example, when a host write command is received from the host device 30, the control unit 11 issues a write command to the memory I/F 16 in response to the received host write command. Similarly, when a host read command is received from the host device 30, the control unit 11 issues a read command to the memory I/F 16 in response to the received host read command. Meanwhile, in a case of erasing, for example, the control unit 11 issues an erase command to the memory I/F 16 as part of a processing such as garbage collection (also called compaction). In addition, the control unit 11 controls execution of various processing for managing the non-volatile memory 20, such as wear leveling, refreshing, patrol reading, and the like, in addition to the garbage collection.

In a case where the control unit 11 receives a host command from the host 30 through the host I/F 15, the control unit 11 performs a control according to the received host command. For example, the control unit 11 issues, to the memory I/F 16, an instruction of a processing of writing data to the non-volatile memory 20 according to a host write command from the host 30. In addition, the control unit 11 issues, to the memory I/F 16, an instruction of a processing of reading data from the non-volatile memory 20 according to a host read command from the host 30.

Further, in a case where the control unit 11 receives the host write command from the host 30, the control unit 11 determines a storing region in the non-volatile memory 20 for user data accumulated in a data buffer in the buffer memory 19. That is, the control unit 11 manages a region in which the user data is to be written.

A correspondence between a logical address of the user data received from the host 30 and a physical address indicating a storing region in the non-volatile memory 20 in which the user data is stored, is managed in an address-conversion-information lookup table (LUT). The address-conversion-information LUT may also be called as a lookup table. The address-conversion-information LUT is stored in, for example, the non-volatile memory 20 and is read to be cached in the RAM 14 and/or the buffer memory 19 as necessary. In addition, the address-conversion-information LUT may be updated each time the non-volatile memory 20 is accessed according to a command from the host device 30 (for example, a host write).

Further, in a case where the control unit 11 receives the host read command from the host 30, the control unit 11 converts a logical address specified in the host read command into a physical address by using the address-conversion-information LUT described above and issues, to the memory I/F 16, an instruction of reading data from the physical address.

The memory I/F 16 is connected to the non-volatile memory 20 through the memory bus 18 and controls communication with the non-volatile memory 20. The memory I/F 16 outputs, to the non-volatile memory 20, the signal ALE, the signal CLE, the signal WEn, and the signal REn based on a command received from the control unit 11. In addition, at the time of performing a write processing, the memory I/F 16 transmits, to the non-volatile memory 20, a write command issued from the control unit 11 and write data in the data buffer in the buffer memory 19 as the input-and-output signal I/O. At the time of performing a read processing, the memory I/F 16 transmits, to the non-volatile memory 20, a read command issued from the control unit 11 as the input-and-output signal I/O. Further, the memory I/F 16 receives data read from the non-volatile memory 20 as the output signal I/O and transmits the data to the data buffer in the buffer memory 19.

The buffer memory 19 includes a memory region in which write data or read data is temporarily stored. The buffer memory 19 has a larger memory capacity than the RAM 14. The buffer memory 19 may be implemented by a dynamic random access memory (DRAM), a static random access memory (SRAM), or the like.

The buffer I/F 12 is a controller which controls an access from the memory controller 10 to the buffer memory 19, and for example, is a controller which enables an access to the buffer memory 19 at a double data rate (DDR).

The RAM 14 is a memory which can be used as a working memory for storing the address-conversion-information LUT, a master table (that is, snapshot) such as various management tables read from a specific region in the non-volatile memory 20 and loaded at the time of starting the memory system 1 or the like, log information which is changes in the various management tables, and the like. In addition, the RAM 14 can also be used as a cache memory used at the time of performing data transmission between the host 30 and the non-volatile memory 20. The RAM 14 may be implemented by a dynamic random access memory (DRAM), a static random access memory (SRAM), or the like.

The ECC unit 13 performs data encoding and decoding in order to perform error detection and error correction on the read data. In detail, the ECC unit 13 encodes data (write data) to be written to the non-volatile memory 20. Further, the ECC unit 13 decodes data (read data) read from the non-volatile memory 20. The ECC unit 13 performs error detection and error correction on the read data by the decoding. In a case where the error correction fails, the ECC unit 13 notifies the control unit 11 of the fact that the error correction fails. As an algorithm of the encoding and the decoding performed by the ECC unit 13, any algorithm such as using a Reed-Solomon (RS) code, a Bose-Chaudhuri-Hocquenghem (BCH) code, and a low-density parity-check code (LDPC) may be applied.

For example, at the time of a write processing, the ECC unit 13 receives user data to be written to the non-volatile memory 20 according to a write command and generates parity based on the user data, and the parity is added to the user data to form write data according to the control by the control unit 11. The write data including the parity are written as encoded data to the non-volatile memory 20.

At the time of a read processing, the ECC unit 13 receives read data read from the non-volatile memory 20 according to a read command, obtains parity from the read data, generates a syndrome based on the parity, and determines a presence or absence of an error bit in the user data, according to the control by the control unit 11. The ECC unit 13 specifies a position of the error bit in a case where the error bit is detected in the user data. The number of error bits correctable by the ECC unit 13 is determined based on, for example, the number of parity bits. In a case where an equal or smaller number of error bits than the number of correctable error bits are detected in the user data, the ECC unit 13 can correct the error bits and notifies the control unit 11 of the fact that the correction succeeds. In a case where a larger number of error bits than the number of correctable error bits are detected in the user data, the ECC unit 13 cannot perform the error correction and notifies the control unit 11 of the fact that the correction fails.

The non-volatile memory 20 includes a command processor 21, a driving unit 22, a memory cell array 23, a column module 24, and the temperature sensor 25. The command processor 21 includes a sequencer 211, a command resistor (CMD resistor) 212, and an address resistor (ADD resistor) 213. The driving unit 22 includes a driver circuit 221 and a row decoder (R/D) 222.

The memory cell array 23 includes a plurality of memory cells (a plurality of memory cell transistors MT). Each memory cell is mapped to a row and a column. The memory cell array 23 stores data received from the memory controller 10.

The row decoder 222 selects a block to be accessed, and selects a row direction of the selected block.

The driver circuit 221 supplies a voltage to the selected block through the row decoder 222.

The column module 24 includes, for example, a sense amplifier and a data latch constituted by a plurality of latch circuits. The column module 24 transmits, to the memory cell array 23, write data DAT received from the memory controller 10, in a write operation. In addition, the column module 24 senses data read from the memory cell array 23 and performs a necessary calculation in a read operation. Further, the column module 24 outputs the obtained data DAT to the memory controller 10.

The address resistor 213 stores an address ADD received from the memory controller 10. The command resistor 212 stores a command CMD received from the memory controller 10.

The sequencer 211 controls an operation of the entire non-volatile memory 20 based on a command CMD stored in the command resistor 212.

The temperature sensor 25 senses temperature around the memory cell array 23 at all times, periodically, or as necessary, and outputs the signal TEMP indicating the sensed temperature to the memory controller 10.

Figure 2:
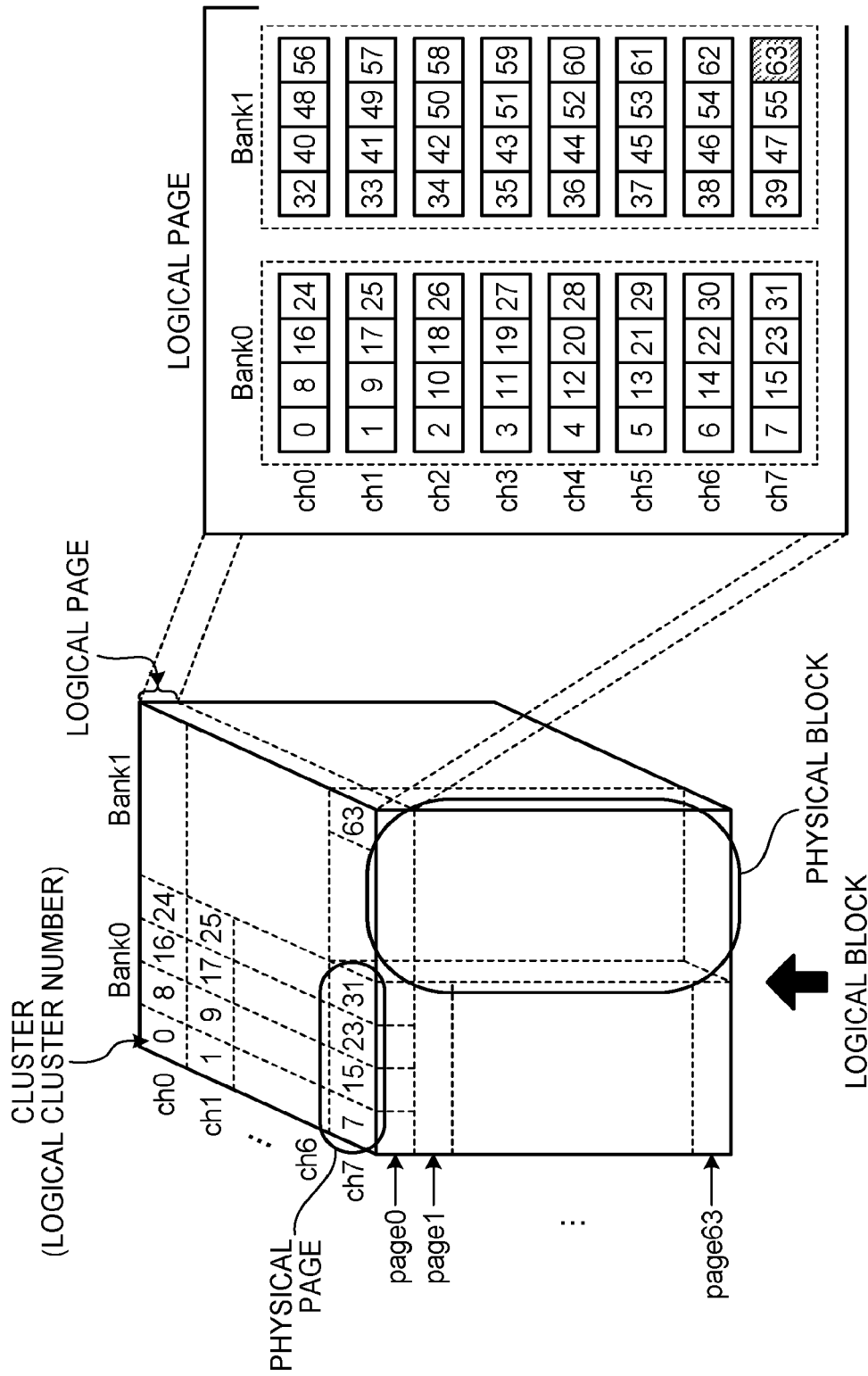
FIG. 2 is a view illustrating a management unit of data in a non-volatile memory according to the embodiment.

Next, a management unit of data in the non-volatile memory 20 will be described with reference to FIG. 2. FIG. 2 is a view illustrating a management unit of data in the non-volatile memory 20.

The non-volatile memory 20 of FIG. 1 may include a plurality of memory chips. Each memory chip includes a memory cell array. The memory cell array 23 of FIG. 1 may be configured as an assembly of the memory cell arrays of the respective memory chips. In the memory cell array of each memory chip, a unit which can be accessed to collectively write and read data is a physical page. A physical block is constituted by a plurality of physical pages and is the smallest access unit from which data can be independently erased. In addition, in the example illustrated in FIG. 2, a case where the memory chips are connected to eight channels ch0 to ch7 is illustrated. The memory controller 10 can control each of the respective channels ch0 to ch7 in parallel. Further, the memory controller 10 can perform a plurality of operations in parallel by, for example, a 2-way bank interleave per one channel, for each of the channels ch0 to ch7. As a result, 16 physical pages in which and from which writing and reading of data can be almost collectively performed in parallel may form one logical page as a data recording region, and 16 physical blocks from which data can be almost collectively erased in parallel may form one logical block. The garbage collection (compaction) may be performed in a unit of one logical block.

In addition, data in the non-volatile memory 20 are managed by the control unit 11 by a cluster which is a data management unit smaller than one physical page. A size of the cluster is equal to or larger than a size of a sector which is the smallest unit accessible by the host device 30, and the size of the cluster is determined so that a natural number multiple of the size of the cluster becomes a size of the physical page. For example, one physical page may be constituted by four clusters and one logical page may be constituted by 64 clusters.

In the address-conversion-information LUT used to perform conversion between the logical address and the physical address for an access to the non-volatile memory 20, the logical address and the physical address are mapped to each other. The logical address may be, for example, a logical block address (LBA). The physical address may be a combination of logical block identification information (for example, a logical block number) and cluster identification information (for example, a logical page number+logical cluster number). The logical cluster number indicates a position of a cluster in a logical page (see FIG. 2).

Figure 3:
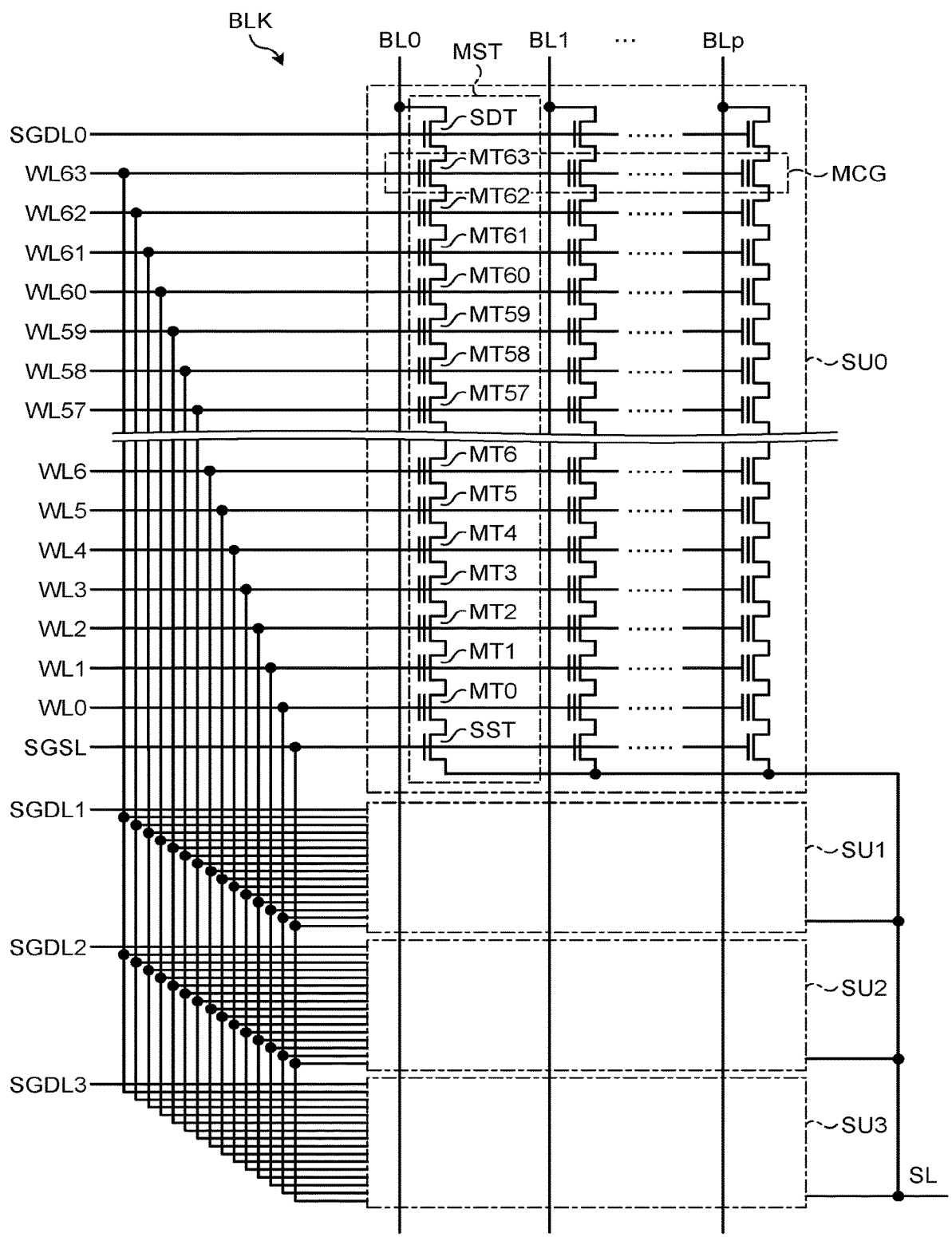
FIG. 3 is a circuit diagram illustrating a configuration of a physical block according to the embodiment.

Each physical block in a memory cell array of each memory chip is configured, for example, as illustrated in FIG. 3. FIG. 3 is a diagram illustrating a configuration of a physical block BLK.

Each physical block BLK includes a plurality of string units SU0 to SU3. The plurality of string units SU0 to SU3 correspond to a plurality of selection gate lines SGDL0 to SGDL3, respectively, and share a selection gate line SGSL with one another. Each of the string units SU0 to SU3 functions as a driving unit in the physical block BLK. Each of the string units SU0 to SU3 can be driven by a corresponding selection gate line among the plurality of selection gate lines SGDL0 to SGDL3, and the selection gate line SGSL. In addition, each of the string units SU0 to SU3 includes a plurality of memory strings MST.

Each memory string MST includes, for example, 64 memory cell transistors MT (MT0 to MT63), and selection transistors SDT and SST. The memory cell transistor MT includes a control gate and a charge storage film, and stores data in a non-volatile manner. Further, the 64 memory cell transistors MT (MT0 to MT63) are connected in series between a source of the selection transistor SDT and a drain of the selection transistor SST. It should be noted that the number of memory cell transistors MT in the memory string MST is not limited to 64.

Word lines WL0 to WL63 (in a case of not distinguishing the respective word lines from each other, the word lines will be collectively represented by WL) are each commonly connected to a control gate of the memory cell transistor MT in each memory string MST in each string unit SU in the physical block BLK. That is, a control gate of the memory cell transistors MT positioned in the same row in each string unit SU in the physical block BLK is connected to the same word line WL. In other words, the string unit SU of the physical block BLK includes a plurality of memory cell groups MCG corresponding to the plurality of word lines WL, respectively, and each memory cell group MCG includes (p+1) memory cell transistors MT connected to the same word line WL. In a case where each memory cell transistor MT can store values of 1-bit (in a case of operating in a single-level cell (SLC) mode), (p+1) memory cell transistors MT connected to the same word line WL (that is, the memory group MCG) are treated as one physical page, and an operation of writing data and an operation of reading data are performed on each physical page.

Each memory cell transistor MT can store values of multiple bits in some cases. For example, in a case where each memory cell transistor MT can store values of n-bits (n≥2), a storage capacity of each word line WL becomes equal to a size of n physical pages. That is, each memory cell group MCG is treated as n physical pages. For example, in a multi-level cell (MLC) mode in which each memory cell transistor MT stores values of 2-bits, each word line WL can store data of two physical pages. Alternatively, in a triple-level cell (TLC) mode in which each memory cell transistor MT stores values of 3-bits, each word line WL can store data of three physical pages.

Figure 4:
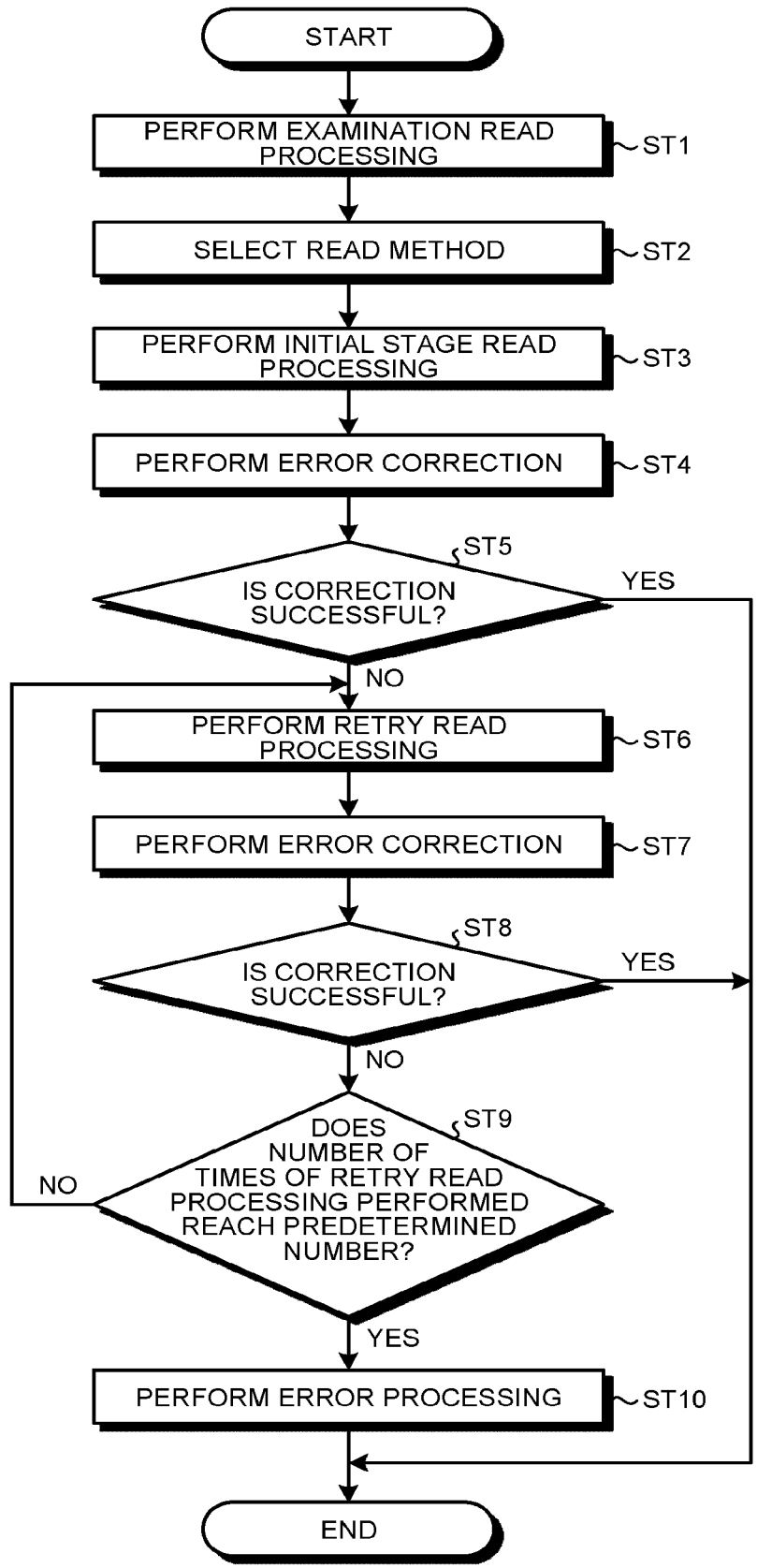
FIG. 4 is a flowchart illustrating an overall operation of the memory system according to the embodiment.

Next, an overall operation of the memory system 1 will be described with reference to FIG. 4. FIG. 4 is a flowchart illustrating the overall operation of the memory system 1.

In the memory system 1, the memory controller 10 performs an examination read processing when an execution condition to execute the examination read command is satisfied (ST1). Details of the execution condition will be described later. In the examination read processing, the memory controller 10 issues, to the non-volatile memory 20, the examination read command according to a predetermined read method to be executed on a predetermined region.

The predetermined region may be an entire region of the physical block in a case where data is written in all clusters in the physical block, or may be a word line WL adjacent to a predetermined word line WL in which writing of data is completed. The data may be written according to a host write command, or may be written according to garbage collection (compaction). The predetermined read method may be a read method (for example, any one of FastRead, Normal-Read, and dynamic look ahead read (DLAread)) selected according to a result of a previous examination read command.

When read data is received as a response to the examination read command from the non-volatile memory 20, the memory controller 10 performs the error correction on the read data and acquires information on the error correction of the read data. The error correction is also called error check and correction (ECC).

The information on the error correction of the read data includes at least one of a bit error ratio detected by the error correction of the read data, and a retry ratio of the read operation on the non-volatile memory 20. The bit error ratio is an error occurrence rate per one bit and can be obtained by dividing the number of error bits of the user data detected by the ECC unit 13 by the number of all bits. The bit error ratio is also called a BER. The number of error bits is also called a fail bit count (FBC). The retry ratio is a retry read occurrence rate according to a correction failure (i.e., uncorrectable) in the ECC unit 13 and can be obtained by dividing the number of times of occurrence of a retry read by the number of times of execution of an initial read processing.

The memory controller 10 selects one read method from the plurality of read methods, as a read method to be applied to the initial read processing based on the information on the error correction of the read data of the examination read command (ST2). The plurality of read methods include read methods with different read time tRead required to perform the read operation on the non-volatile memory 20, such as those illustrated in FIG. 5. FIG. 5 is a diagram illustrating characteristics of the plurality of read methods.

The plurality of read methods as candidates to be applied to the initial read processing include, for example, the FastRead, the NormalRead, and the DLAread.

The NormalRead is a normal read operation in which a value of a read voltage (also called a read level) applied to the word line at the time of reading is a predetermined reference value.

The FastRead is a read operation in which, for example, a time for which the read level is applied is decreased in comparison to the NormalRead to decrease the read time.

The DLAread is a read operation in which the read level is selected or adjusted based on a value read from a memory cell to be read and a value read from a neighboring memory cell positioned in a direction in which the word lines are arranged, or from a neighboring memory cell connected in a neighboring word line.

In a case where the number of times the processing of writing and erasing data in and from the memory cell is performed (the number of P/E cycles) is the same, when it is assumed that read times tRead in the FastRead, the NormalRead, and the DLAread are T1, T2, and T3, respectively, a relation of the following Expression 1 is satisfied. It is preferable that the read time tRead is short, in terms of the performance.

$$T1<T2<T3 \qquad \text{Expression 1}$$

As represented by Expression 1, it is considered that the read method needs to be selected in order of the FastRead, the NormalRead, and then the DLAread in terms of the performance.

Meanwhile, in a case where the number of P/E cycles is the same, when it is assumed that average BERs detected by the error correction in the FastRead, the NormalRead, and the DLAread are ER1, ER2, and ER3, respectively, a relation of the following Expression 2 is satisfied. It is preferable that the BER is low, in terms of the reliability.

$$ER1>ER2>ER3 \qquad \text{Expression 2}$$

Further, in a case where the number of P/E cycles is the same, when it is assumed that average retry ratios of the read operation in the FastRead, the NormalRead, and the DLAread are RR1, RR2, and RR3, respectively, a relation of the following Expression 3 is satisfied. It is preferable that the retry ratio is low, in terms of the reliability.

$$RR1>RR2>RR3 \qquad \text{Expression 3}$$

As represented by Expression 2 or 3, it is considered that the read method needs to be selected in order of the DLAread, the NormalRead, and then the FastRead, in terms of the reliability.

Comparing the BER and the retry ratio, the BER and the retry ratio are different from each other in that the BER is information corresponding to bit errors in both cases of an error correction success and an error correction failure, and the retry ratio is information corresponding to the error correction failure. For this reason, the BER is more accurate to indicate the reliability, but a longer calculation time therefor is required. Therefore, the BER and the retry ratio may be properly used in a manner in which the BER is used when accuracy is important and the retry ratio is used when a reduction of the calculation time is important.

A threshold for the information indicating the reliability to determine a current level of reliability may be prepared. For example, a plurality of thresholds ERth1 and ERth2 having a relation represented by the following Expression 4 may be prepared for the BER.

$$ERth1<ERth2 \qquad \text{Expression 4}$$

Further, a plurality of thresholds RRth1 and RRth2 having a relation represented by the following Expression 5 may be prepared for the retry ratio.

$$RRth1<RRth2 \qquad \text{Expression 5}$$

For example, as a read method to be applied to the initial read, the memory controller 10 selects the FastRead when the BER is less than the ERth1, selects the NormalRead when the BER is equal to or more than the ERth1 and less than the ERth2, and selects the DLAread when the BER is equal to or more than the ERth2.

Alternatively, for example, as a read method to be applied to the initial read, the memory system 1 selects the FastRead when the retry ratio is less than the RRth1, selects the NormalRead when the retry ratio is equal to or more than the RRth1 and less than the RRth2, and selects the DLAread when the retry ratio is equal to or more than the RRth2.

Values of the respective thresholds represented by Expression 4 and 5 may be experimentally determined in advance and set according to a specification required for the memory system 1.

Refer back to FIG. 4. The memory controller 10 performs the initial read processing (ST3). That is, the memory controller 10 issues a read command according to one read method selected in ST2 to the non-volatile memory 20. For example, the memory controller 10 performs the initial read processing according to a host read command from the host device 30.

When read data is received as a response to the read command issued in ST3 from the non-volatile memory 20, the memory controller 10 performs error correction on the read data (ST4). When the error correction succeeds (Yes in ST5), the memory controller 10 ends the processing.

When the error correction fails (No in ST5), the memory controller 10 performs a retry read processing (ST6). That is, the memory controller 10 changes the read method to a read method with a higher reliability and issues a read command according to the changed read method to the non-volatile memory 20. As the read method to be applied to the retry read processing, any read method with a higher reliability than that of the read method applied to the initial read processing may be applied. For example, VthTracking illustrated in FIG. 5 may be applied.

The VthTracking is a read operation of performing a single-level read multiple times while shifting a read level at a predetermined interval to generate a histogram of distribution of threshold voltages (threshold voltage distribution) of programmed memory cells included in a page and perform reading by using the read level adjusted based on the generated threshold voltage distribution. The VthTracking is also called a tracking read. As the VthTracking, a read method performed according to the control by the memory controller 10 and a read method performed in the non-volatile memory 20 without depending on the control by the memory controller 10 are present, and in the present embodiment, however, any one thereof may be used as the VthTracking.

In a case where the number of P/E cycles is the same, when it is assumed that read times tRead in the FastRead, the NormalRead, the DLAread, and the VthTracking are T1, T2, T3, and T4, respectively, a relation of the following Expression 6 is satisfied.

$$T1<T2<T3\ll T4 \qquad \text{Expression 6}$$

As represented by Expression 6, since severe performance deterioration might occur, it is considered that the VthTracking is a read method which is not suitable for the initial read processing.

In a case where the number of P/E cycles is the same, when it is assumed that average BERs detected by the error correction in the FastRead, the NormalRead, the DLAread, and the VthTracking are ER1, ER2, ER3, and ER4, respectively, a relation of the following Expression 7 is satisfied.

$$ER1>ER2>ER3>ER4 \qquad \text{Expression 7}$$

Further, in a case where the number of P/E cycles is the same, when it is assumed that average retry ratios of the read operation in the FastRead, the NormalRead, the DLAread, and the VthTracking are RR1, RR2, RR3, and RR4, respectively, a relation of the following Expression 8 is satisfied.

$$RR1>RR2>RR3>RR4 \qquad \text{Expression 8}$$

Refer back to FIG. 4. When read data is received as a response to the read command issued in ST6 from the non-volatile memory 20, the memory controller 10 performs error correction on the read data (ST7). When the error correction succeeds (Yes in ST8), the memory controller 10 ends the processing.

In a case where the error correction fails (No in ST8), the memory controller 10 repeatedly performs ST6 to ST8 while changing a read method to a method with a higher reliability until the number of times the retry read processing is performed reaches a predetermined number (No in ST9). The predetermined number may be experimentally determined in advance and set according to a specification required for the memory system 1. When the number of times the retry read processing is performed reaches the predetermined number (Yes in ST9), the memory controller 10 performs an error processing of notifying the host device 30 of a read error with a response to the host read command (ST10) and ends the processing.

Figure 6:
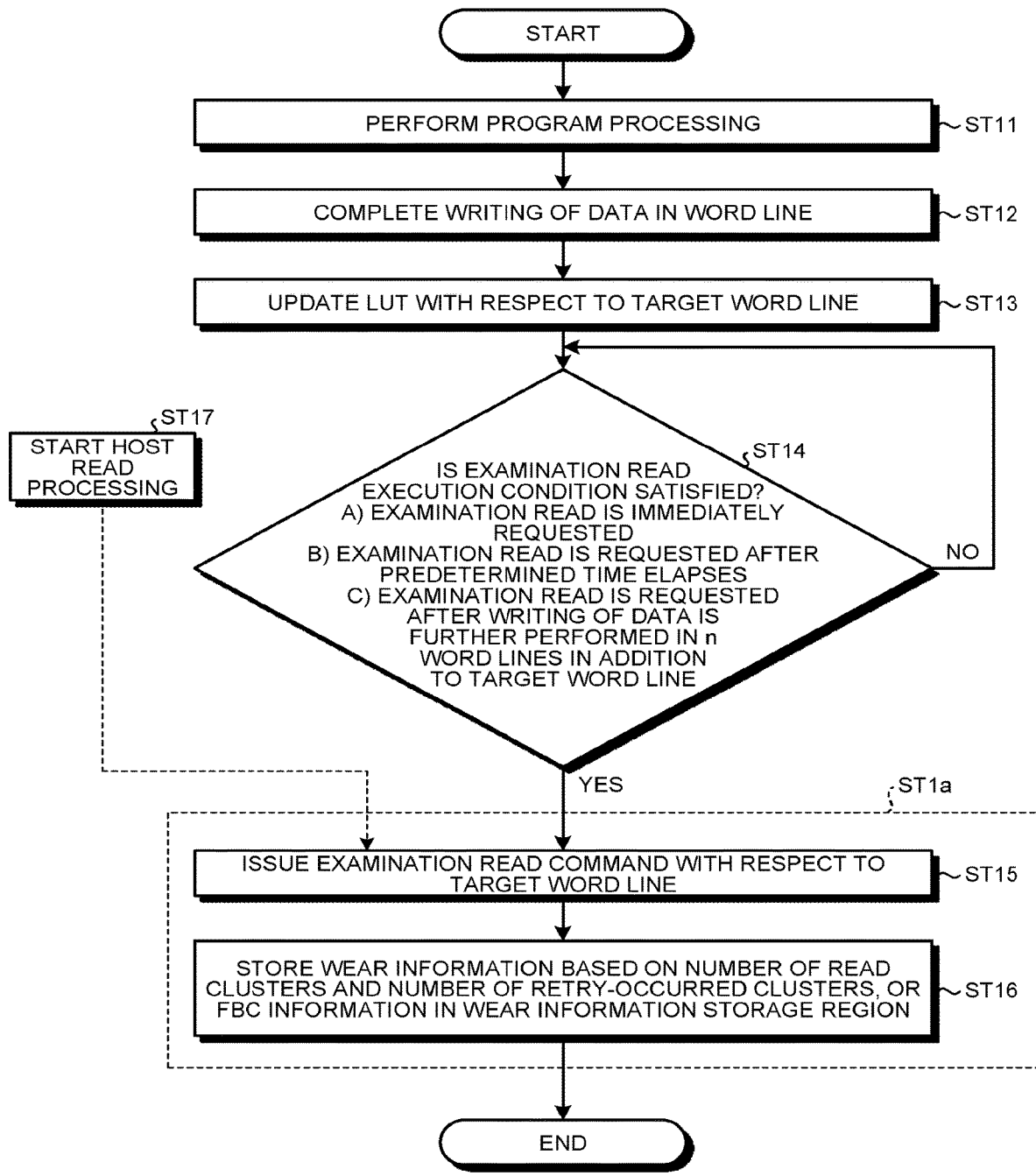
FIG. 6 is a flowchart illustrating a detailed operation (an example of implementation of an examination read processing) of the memory system according to the embodiment.
Figure 7:
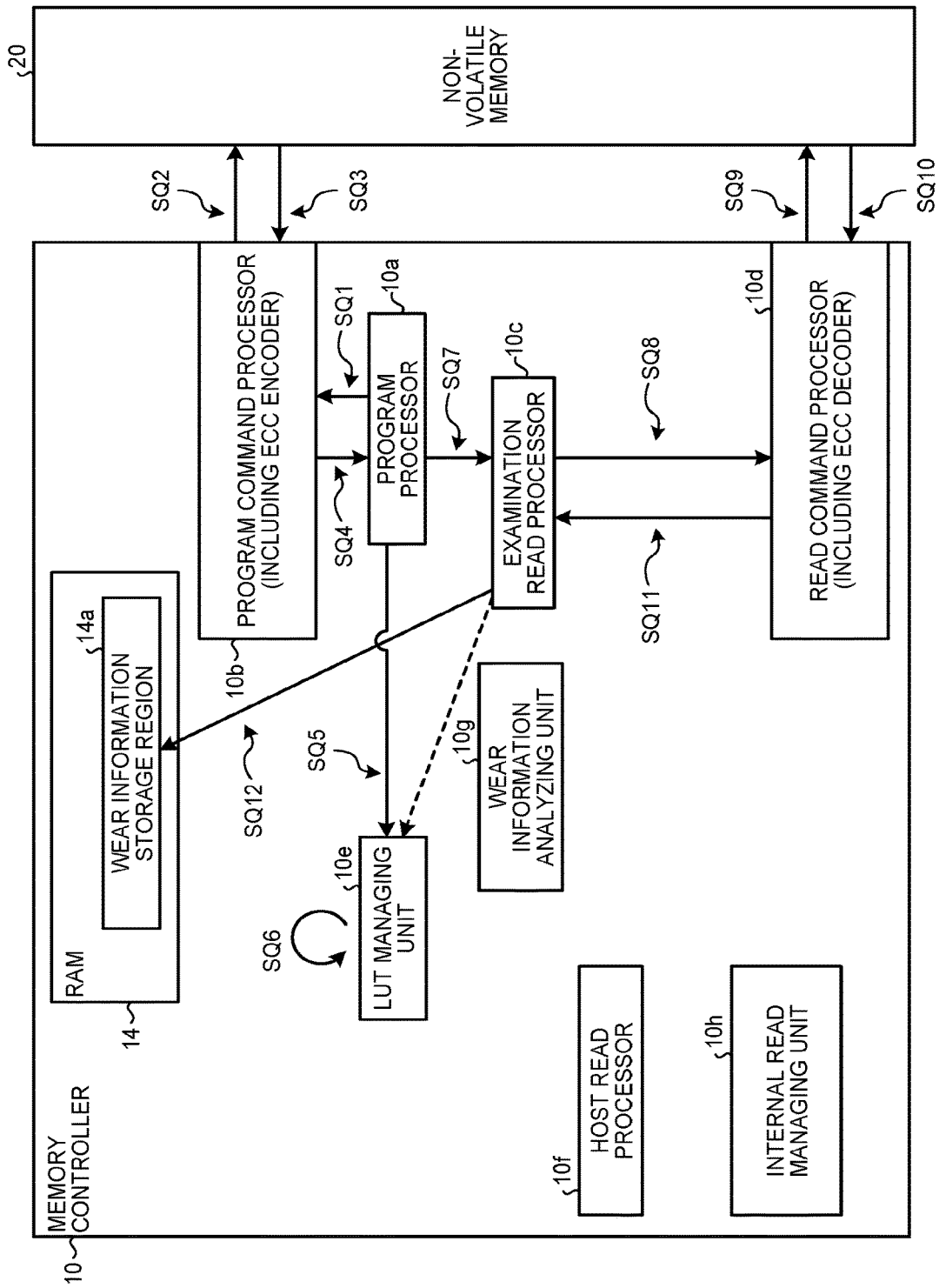
FIG. 7 is a dataflow diagram illustrating the detailed operation of the memory system according to the embodiment.

Next, a specific example of implementation of the examination read processing (ST1) will be described with reference to FIGS. 6 and 7. FIG. 6 is a flowchart illustrating a detailed operation (an example of implementation of the examination read processing) of the memory system 1. FIG. 7 is a dataflow diagram illustrating the detailed operation of the memory system. FIGS. 6 and 7 illustrate processing including a program processing, the examination read processing, and accumulation of wear information and an update of the address-conversion-information LUT.

As illustrated in FIG. 6, in the memory system 1, the memory controller 10 performs the program processing (ST11).

As illustrated in FIG. 7, the memory controller 10 may include a program processor 10a, a program command processor 10b, an examination read processor 10c, a read command processor 10d, an LUT managing unit 10e, a host read processor 10f, a wear information analyzing unit 10g, and an internal read managing unit 10h as functional components. As mentioned before, the memory controller 10 may be implemented as a controller package including, for example, a system-on-a-chip (SoC). The functional components illustrated in FIG. 7 may be implemented in a hardware manner (for example, as a circuit). Alternatively, the respective functions illustrated in FIG. 7 may be implemented in a software manner (for example, by the control unit 11 executing firmware loaded collectively or sequentially according to the progress of the processing in the buffer memory 26 or the like). Alternatively, some of the respective functions illustrated in FIG. 7 may be implemented in a hardware manner and the others may be implemented in a software manner in the controller package. Further, a wear information storage region 14a may be allocated in the RAM 14 in advance as a region for storing the wear information.

The program processor 10a supplies a program request to the program command processor 10b (SQ1). The program command processor 10b issues a program command (write command) to the non-volatile memory 20 (SQ2) in response to the program request. The program command processor 10b includes an ECC encoder, and can issue, to the non-volatile memory 20, the program command including encoded write data obtained by adding parity to the user data.

Then, the non-volatile memory 20 performs a write operation on a region specified in the write command. When writing of data in a predetermined word line is completed (ST12 in FIG. 6), the non-volatile memory 20 returns, to the program command processor 10b, a notification indicating that the writing of data in the predetermined word line is completed (SQ3 in FIG. 7). Then, the program command processor 10b returns a response to the program processor 10a (SQ4). The program processor 10a recognizes that the writing of data in the predetermined word line is completed according to the response.

When the writing of data in the predetermined word line is completed, as illustrated in FIG. 6, the memory controller 10 updates the address-conversion-information LUT with respect to a target word line (ST13).

For example, the program processor 10a illustrated in FIG. 7 supplies an LUT update request to the LUT managing unit 10e (SQ5). The LUT managing unit 10e accesses the address-conversion-information LUT stored in the RAM 14 and/or the buffer memory 19 and adds, to the address-conversion-information LUT, information of a word line indicated in the notification (SQ3) indicating that writing of data in the word line is completed, thereby updating the address-conversion-information LUT. The LUT managing unit 10e writes the updated address-conversion-information LUT back in the RAM 14 and/or the buffer memory (SQ6).

Refer back to FIG. 6. The memory controller 10 determines whether or not the execution condition indicating that the examination read command needs to be executed is satisfied (ST14). As the execution condition, for example, any one or a combination of the following A) to C) may be used.

A) The examination read is immediately requested with respect to the word line in which the writing of data is completed.

B) A predetermined time measured by a timer elapses from a timing when the writing of data is completed and the examination read is requested after the predetermined time elapses. The predetermined time is a time for which a change amount of a threshold voltage of a memory cell per unit time is a predetermined threshold or more. For example, the predetermined time is several seconds to several minutes.

C) The examination read is requested after the writing of data is further performed in n word lines (n is any positive integer) in addition to the word line in which the writing of data is completed.

The memory controller 10 waits until the execution condition is satisfied (No in ST14), and performs the examination read processing when the execution condition is satisfied (Yes in ST14) (ST1a).

In the examination read processing (ST1a), the memory controller 10 issues, to the non-volatile memory 20, the examination read command specifying the word line in which the writing of data is completed in ST12 as a target word line (ST15).

In a case where the memory controller 10 receives a host read command from the host device 30, the memory controller 10 may start the host read processing according to the host read command (ST17) before it is determined as Yes in ST14, and issue, to the non-volatile memory 20, an examination read command which combines a read instruction for examining a wear state of a memory cell and a read instruction according to the host read command.

When read data is received as a response to the examination read command from the non-volatile memory 20, the memory controller 10 performs error correction on the read data and acquires information on the error correction of the read data. That is, the memory controller 10 acquires the number of read clusters and the number of retry-occurred clusters, or FBC information, as the information on the error correction of the read data, generates or updates wear information 14a1 based on the acquired information, and stores the wear information 14a1 in the wear information storage region 14a in the RAM 14 (ST16).

For example, when the execution condition is satisfied, the program processor 10a illustrated in FIG. 7 supplies an examination read request to the examination read processor 10c (SQ7). The examination read processor 10c supplies a read request to the read command processor 10d (SQ8) in response to the examination read request. The read command processor 10d issues a read command to the non-volatile memory 20 (SQ9) in response to the Read request.

Then, the non-volatile memory 20 performs a read operation on a region specified in the read command. When the read operation is completed, the non-volatile memory 20 returns read data to the read command processor 10d (SQ10).

The read command processor 10d includes an ECC decoder, and when the read data is received as a response to the examination read command from the non-volatile memory 20, the read command processor 10d performs error correction on the read data and supplies an ECC correction result, or the FBC information to the examination read processor 10c (SQ11). The examination read processor 10c generates the wear information 14a1 according to a read amount, the number of times of retry, and the FBC information, and stores the wear information 14a1 in the wear information storage region 14a in the RAM 14 (SQ12).

The wear information 14a1 has, for example, a data structure illustrated in FIG. 8. FIG. 8 is a diagram illustrating a data structure of the wear information 14a1. The number of read clusters and the number of retry-occurred clusters in the wear information 14a1 may be recorded for each physical block of each chip. The data structure of the wear information 14a1 is not limited to the example illustrated in FIG. 8, and for example, the number of read bits and the number of error bits may be recorded in addition to or instead of the number of read clusters and the number of retry-occurred clusters.

It should be noted that the memory controller 10 may perform the update (ST13) of the address-conversion-information LUT illustrated in FIG. 6 after the examination read processing (ST1a) is completed.

For example, as represented by a dotted arrow in FIG. 7, the examination read processor 10c may supply the LUT update request to the LUT managing unit 10e after storing the wear information 14a1.

Figure 9:
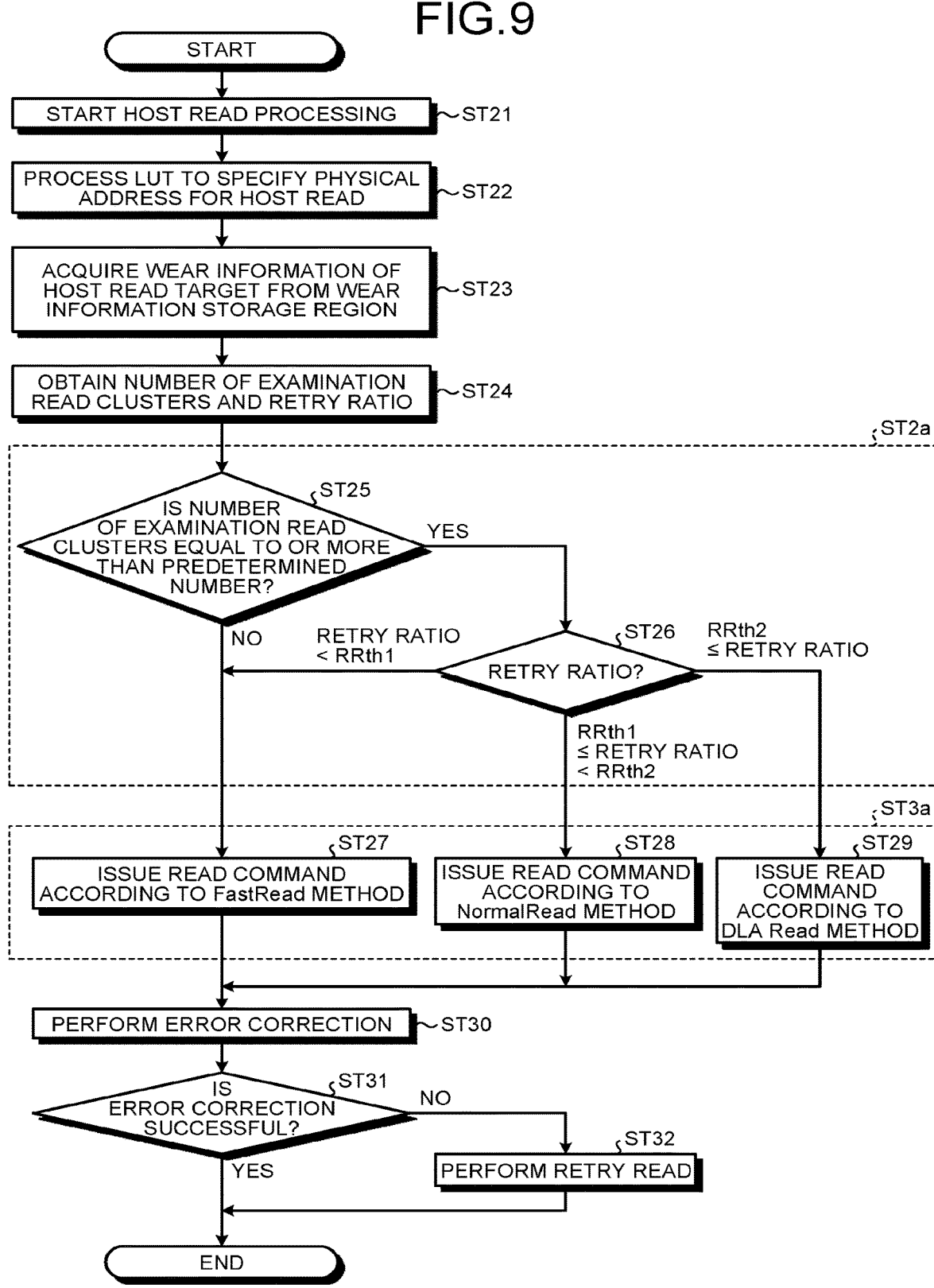
FIG. 9 is a flowchart illustrating a detailed operation (an example of implementation of read method selection) of the memory system according to the embodiment.
Figure 10:
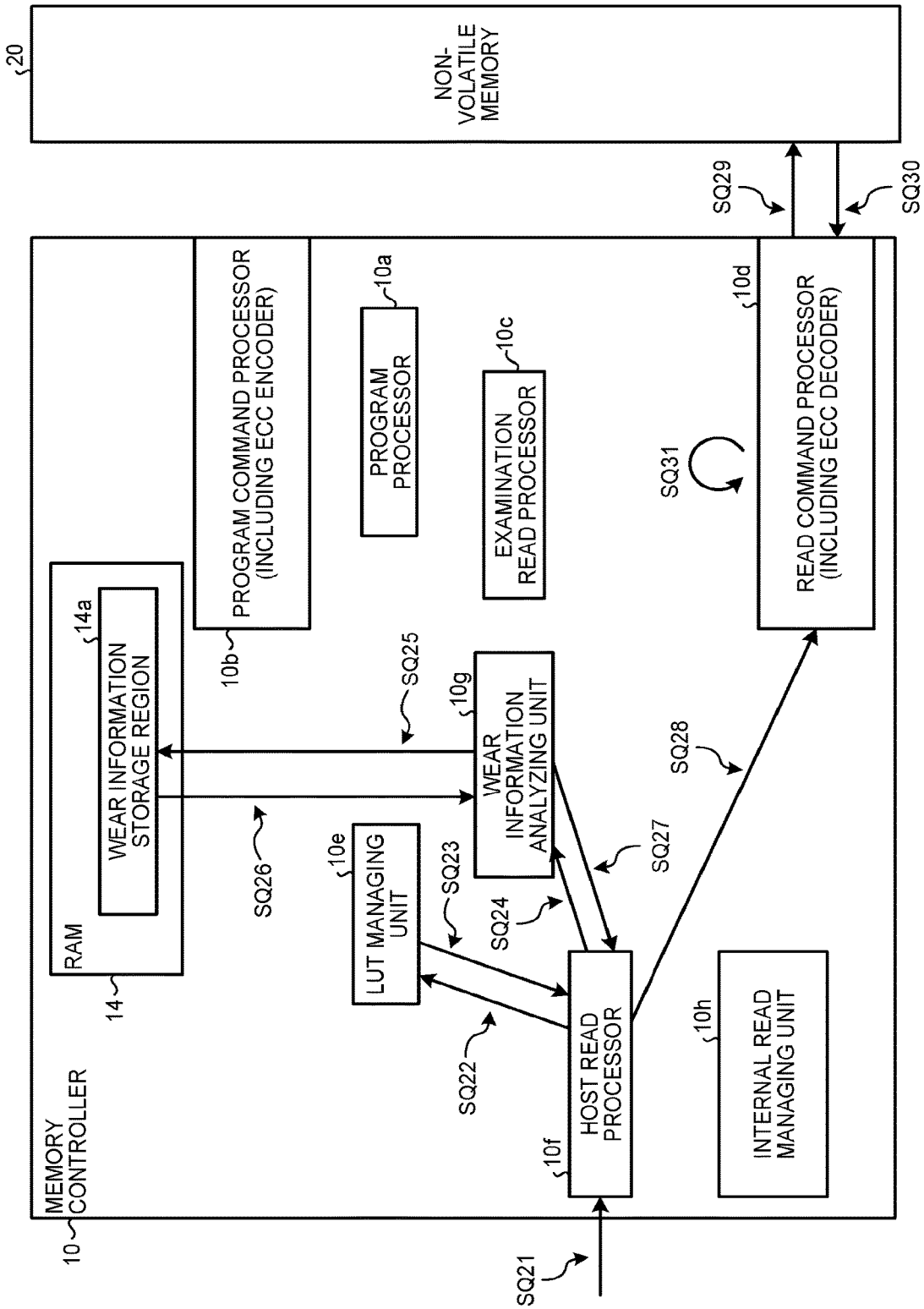
FIG. 10 is a dataflow diagram illustrating the detailed operation of the memory system according to the embodiment.

Next, a specific example of implementation of read method selection (ST2) will be described with reference to FIGS. 9 and 10. FIG. 9 is a flowchart illustrating a detailed operation (an example of implementation of the read method selection) of the memory system 1. FIG. 10 is a dataflow diagram illustrating the detailed operation of the memory system 1. FIGS. 9 and 10 illustrate processings after a host read processing starts.

As illustrated in FIG. 9, when a host read command is received from the host device 30, the memory controller 10 starts the host read processing according to the host read command (ST21), and processes the address-conversion-information LUT to specify a physical address for the host read (ST22).

For example, when the host read command is received from the host device 30 (SQ21), the host read processor 10f illustrated in FIG. 10 supplies an LUT processing request to the LUT managing unit 10e according to the host read command (SQ22). The LUT managing unit 10e accesses the address-conversion-information LUT stored in the RAM 14 and/or the buffer memory 19, and specifies a physical address corresponding to a logical address included in the host read command with reference to the address-conversion-information LUT. The LUT managing unit 10e returns, to the host read processor 10f, information of the specified physical address as a physical address response (SQ23).

Refer back to FIG. 9. The memory controller 10 acquires wear information of a host read target from the wear information storage region 14a in the RAM 14 (ST23), and obtains a retry ratio based on the wear information (ST24).

For example, the host read processor 10f illustrated in FIG. 10 supplies a wear information request to the wear information analyzing unit 10g according to the physical address from the LUT managing unit 10e (SQ24). In response to the wear information request, the wear information analyzing unit 10g supplies the wear information request to the RAM 14 (SQ25) and receives the wear information 14a1 (see FIG. 8) stored in the wear information storage region 14a in the RAM 14 as a wear information response (SQ26). The wear information analyzing unit 10g obtains the number of examination read clusters 14a11 and a retry ratio 14a2 (see FIG. 8) corresponding to the physical address in SQ23 as a wear information analysis result based on the wear information 14a1. The wear information analyzing unit 10g may obtain the retry ratio 14a2 by dividing the number of retry-occurred clusters 14a12 by the number of examination read clusters 14a11. The wear information analyzing unit 10g returns the wear information analysis result to the host read processor 10f (SQ27).

Refer back to FIG. 9. The memory controller 10 selects one read method among the plurality of read methods according to the number of examination read clusters 14a11 and the retry ratio 14a2 obtained in ST24 (ST2a), performs the initial read processing (ST3a), and performs error correction on read data when the read data is received as a response from the non-volatile memory 20 (ST30).

In the read method selection (ST2a), the memory controller 10 determines whether or not the number of examination read clusters 14a11 is equal to or more than a predetermined number (ST25), and when it is determined that the number of examination read clusters 14a11 is equal to or more than the predetermined number (Yes in ST25), the memory controller 10 further determines whether the retry ratio exceeds the thresholds RRth1 and RRth2 (ST26). The predetermined number may be experimentally determined and set according to a specification required for the memory system 1.

It should be noted that confirming the number of examination read clusters is equal to or more than the predetermined number in ST25, enables to perform the switching with high accuracy.

In a case where the number of examination read clusters 14a11 is less than the predetermined number (No in ST25) or the retry ratio is less than the threshold RRth1 ("retry ratio<RRth1" in ST26), the memory controller 10 selects the FastRead as the read method and the processing proceeds to ST27.

In a case where the retry ratio is equal to or more than the threshold RRth1 and less than the threshold RRth2 ("RRth1 retry ratio<RRth2" in ST26), the memory controller 10 selects the NormalRead as the read method and the processing proceeds to ST28.

In a case where the retry ratio is equal to or more than the threshold RRth2 ("RRth2 retry ratio" in ST26), the memory controller 10 selects the DLARead as the read method and the processing proceeds to ST29.

In the initial read processing (ST3a), when the FastRead is selected in the read method selection (ST2a), the memory controller 10 issues, to the non-volatile memory 20, a read command according to the FastRead method (ST27). When the NormalRead is selected in the read method selection (ST2a), the memory controller 10 issues, to the non-volatile memory 20, a read command according to the NormalRead method (ST28). When the DLARead is selected in the read method selection (ST2a), the memory controller 10 issues, to the non-volatile memory 20, a read command according to the DLARead method (ST29).

The host read processor 10f illustrated in FIG. 10 selects a read method (for example, by the processing in ST2a in FIG. 9) according to the wear information analysis result and supplies a read request according to the selected read method to the read command processor 10d (SQ28). In a case where the FastRead is selected, the host read processor 10f supplies a read request according to the FastRead to the read command processor 10d. In a case where the Normal-Read is selected, the host read processor 10f supplies a read request according to the NormalRead to the read command processor 10d. In a case where the DLARead is selected, the host read processor 10f supplies a read request according to the DLARead to the read command processor 10d.

The read command processor 10d issues a read command to the non-volatile memory 20 in response to the read request (SQ29). The read command processor 10d issues a read command according to the FastRead to the non-volatile memory 20 in response to the read request according to the FastRead. The read command processor 10d issues a read command according to the NormalRead to the non-volatile memory 20 in response to the read request according to the NormalRead. The read command processor 10d issues a read command according to the DLARead to the non-volatile memory 20 in response to the read request according to the DLARead.

Then, the non-volatile memory 20 performs a read operation on a region specified in the read command according to the read method specified in the read command. When the read operation is completed, the non-volatile memory 20 returns read data to the read command processor 10d (SQ30).

The read command processor 10d includes the ECC decoder, and when the read data is received as a response to the examination read command from the non-volatile memory 20, the read command processor 10d performs error correction on the read data (SQ31).

Refer back to FIG. 9. When the error correction succeeds (Yes in ST31), the memory controller 10 ends the processing.

When the error correction fails (No in ST31), the memory controller 10 performs the retry read processing (ST32) and ends the processing. It should be noted that processings corresponding to ST6 to ST10 illustrated in FIG. 4 may be performed in ST32.

As described above, according to the present embodiment, in the memory system 1, the memory controller 10 executes a read command for an examination with respect to the non-volatile memory 20, selects a read method according to a result of the execution, and issues, to the non-volatile memory 20, a read command for an outstanding read processing according to the selected read method. Therefore, a read method capable of securing a required reliability while suppressing performance deterioration can be selected and a read command can be issued according to the selected read method. As a result, in comparison to a case of estimating characteristics representing reliability, it is possible to select a more appropriate read method according to an actual wear state of the memory cell, easily improve both of performance and reliability, and improve overall read performance in terms of both performance and reliability. In other words, it is possible to appropriately maintain the reliability of the read operation.

It should be noted that a target range of the examination read processing (ST1) and a range for which the result of the examination read can be applied may be freely determined as long as wear states are considered to be similar to each other in the range. For example, in a case where the target range of the examination read processing (ST1) is one word line, the result of the examination read result is applied for a plurality of logical blocks, a single logical block, a plurality of physical blocks, a signal physical block, or a plurality of word lines. The smaller the range for which the examination read result is applied, the higher the accuracy. However, since a required memory capacity is increased in this case, the range for which the result of the examination read result is applied is to be determined in consideration of a required accuracy and an available memory capacity.

Alternatively, as the target range of the examination read processing (ST1), a specific word line (for example, a word line with a particularly high BER, a word line with a particularly low BER, or a representative word line of a logical block or a physical block) in a logical block or a physical block may be preferentially selected. In this case, it is possible to reduce the number of times of examination read and a required memory capacity.

Alternatively, the target range of the examination read processing (ST1) may be limited to a block on which writing is being performed, or a logical block or a physical block within a predetermined time after writing. By doing so, an examination can be limited to examine the influence of the PD. That is, since focus is placed on wear associated with the number of P/E cycles, there is no need to perform an examination with respect to the elapse of time or the like again.

Alternatively, the target range of the examination read processing (ST1) may be any block. In this case, blocks suffering from the DR, the RD, and the temperature stress also become the target and thus the examination needs to be performed again. However, the stress such as the DR can also be managed, which is advantageous.

A timing when the examination read command is issued may be a predetermined relatively short time (for example, within tens of minutes to hours) after writing in a predetermined region is performed. By doing so, an examination can be limited to examine the influence of the PD. That is, since focus is placed on wear associated with the number of P/E cycles, there is no need to perform an examination with respect to the elapse of time or the like again.

Alternatively, the timing when the examination read command is issued may be a predetermined interval, or may be during a period in which the memory system 1 is in an idle state. In this case, although the examination needs to be performed again, the stress such as the DR can also be managed, which is advantageous.

As an algorithm of the read method selection (ST2), determination may be made by additionally considering the DR, the RD, the temperature, and the number of P/E cycles. By doing so, it is possible to improve accuracy in comparison to a case where determination is made by considering only the information associated with the reliability of read data (e.g., the retry ratio and the bit error ratio).

Alternatively, in a case where the number of error bits (FBC) is used as the wear information for an algorithm of the read method selection (ST2), a criterion for the switching may be changed according to an ECC strength. In this case, appropriate switching according to the ECC strength can be performed.

Alternatively, as an algorithm of the read method selection (ST2), the result from a specific portion such as a word line located at an end portion of a logical block or a physical block, one or more specific physical pages of the plurality of physical pages corresponding to each memory cell group MCG (see FIG. 3), or the like may be weighted. By doing so, it is possible to prevent excessive switching.

Alternatively, as an algorithm of the read method selection (ST2), fine switching of ch/chip/block/word line/page rather than switching of the entire memory system 1 may be performed. By doing so, it is possible to cope with variations in characteristics of the memory cell array 23.

Alternatively, as an algorithm of the read method selection (ST2), the switching does not have to be performed in a one-way manner (for example, in order of the FastRead, the NormalRead, and the DLAread illustrated in FIG. 5), but may be a reversible manner (for example, returning the read method from the NormalRead to the FastRead, or from the DLAread to the NormalRead when the number of error bits (FBC) is decreases). By doing so, it is possible to select the read method appropriately when the retry ratio decreases by the refreshing even if a previous read method is determined based on a state of suffering from the DR, the RD, and the temperature stress. In addition, even in a case where the examination limited to the PD is performed, it is possible to select the read method appropriately when the retry ratio decreases due to an increase in ECC strength.

Alternatively, as an algorithm of the read method selection (ST2), statistics on retry ratios of a plurality of units (for example, a plurality of logical blocks or a plurality of physical blocks) may be compiled to determine the switching. For example, an average value of retry ratios of the plurality of units may be used. Alternatively, an average value of retry ratios of worst N blocks may be used. Alternatively, assuming that the retry ratio follows a normal distribution, a normal distribution of a population may be estimated from the retry ratios of the plurality of units, and a value of $\mu+3\sigma$ may be used. Here, $\mu$ is the average of the estimated normal distribution, $\sigma$ is a standard deviation, and about 99.7% of the retry ratios is equal to or less than $\mu+3\sigma$. By doing so, it is possible to cope with variations in the memory cell array 23.

Alternatively, as a specific example of implementation of the examination read processing (ST1), the examination read command may be issued as a command which combines a read instruction for examining a wear state of a memory cell and a read instruction according to an internal processing. The internal processing may include an examination for detecting a defect that is not detected by a verifying operation in a write processing and an examination of a data retention state of a memory cell.

The examination for detecting a defect that is not detected by a verifying operation in the write processing includes, for example, ReadVerify. The ReadVerify is one of the measures to deal with a word line defect or the like. For example, since a read error occurs in some cases even in a case where a program completion notification is received, the memory controller 10 issues a read command of the ReadVerify to the non-volatile memory 20 and checks a presence or absence of the read error. In a case where reading is performed immediately after programming and a predetermined number or more of errors occur, for example, VthTracking and BCH error correction are performed, and in a case where the correction fails, it is determined that the programming fails. The reading performed by the ReadVerify is the same as a general user data reading, and error correction is also performed.

It should be noted that, in a case where the examination read command is issued as a command which combines the read instruction for examining a wear state of a memory cell and for detecting a defect that is not detected by the verifying operation in the write processing, a timing when the examination read command is issued may be a predetermined relatively short time (for example, within tens of minutes to hours) after writing in a predetermined region is performed. By doing so, the examination can be limited to examine the influence of the PD. That is, since focus is placed on wear associated with the number of P/E cycles, there is no need to perform an examination with respect to the elapse of time or the like again.

The examination of a data retention state of a memory cell includes, for example, a patrol read. The patrol read is used in a patrol processing for the refresh processing. In the patrol processing, a bit error ratio in the target region is evaluated (for example, attempting to correct errors in the patrol reading) to select a block to be subjected to the refreshing. In the refresh processing, data included in the selected block to be subjected to the refreshing is read, the error correction is performed, and rewriting is performed on another block (or the block to be subjected to the refreshing). By doing so, it is possible to improve a reliability of data stored in the memory cell array 23.

Figure 11:
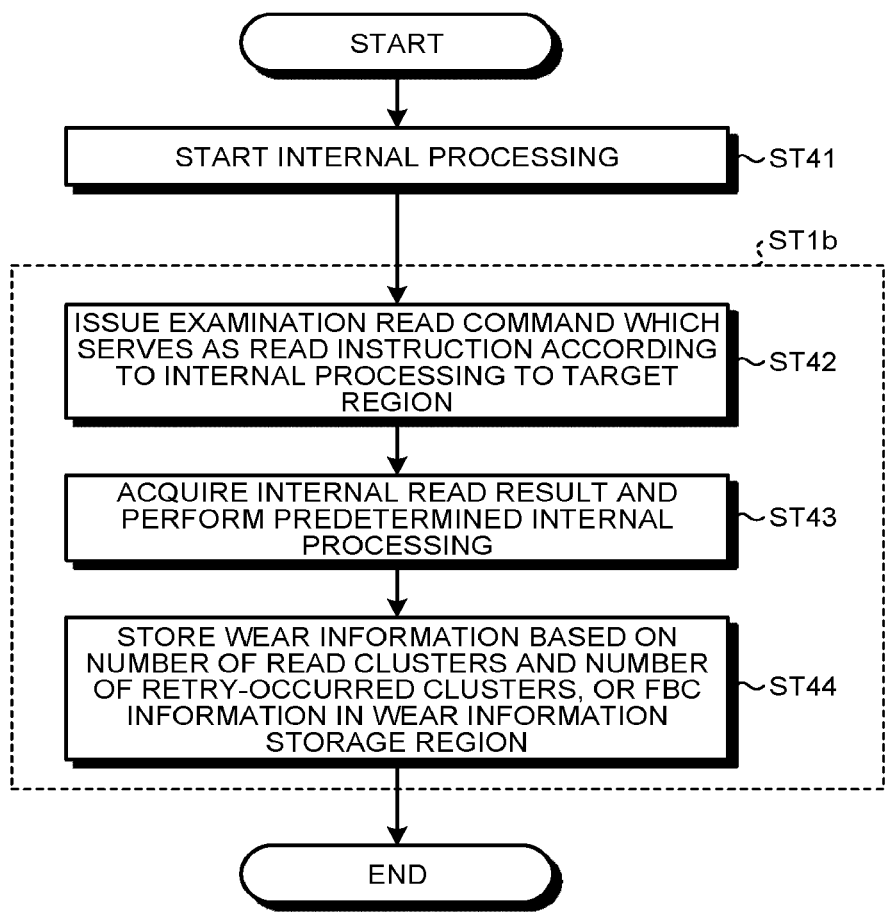
FIG. 11 is a flowchart illustrating a detailed operation (another example of implementation of the examination read processing) of the memory system according to a modified example of the embodiment.
Figure 12:
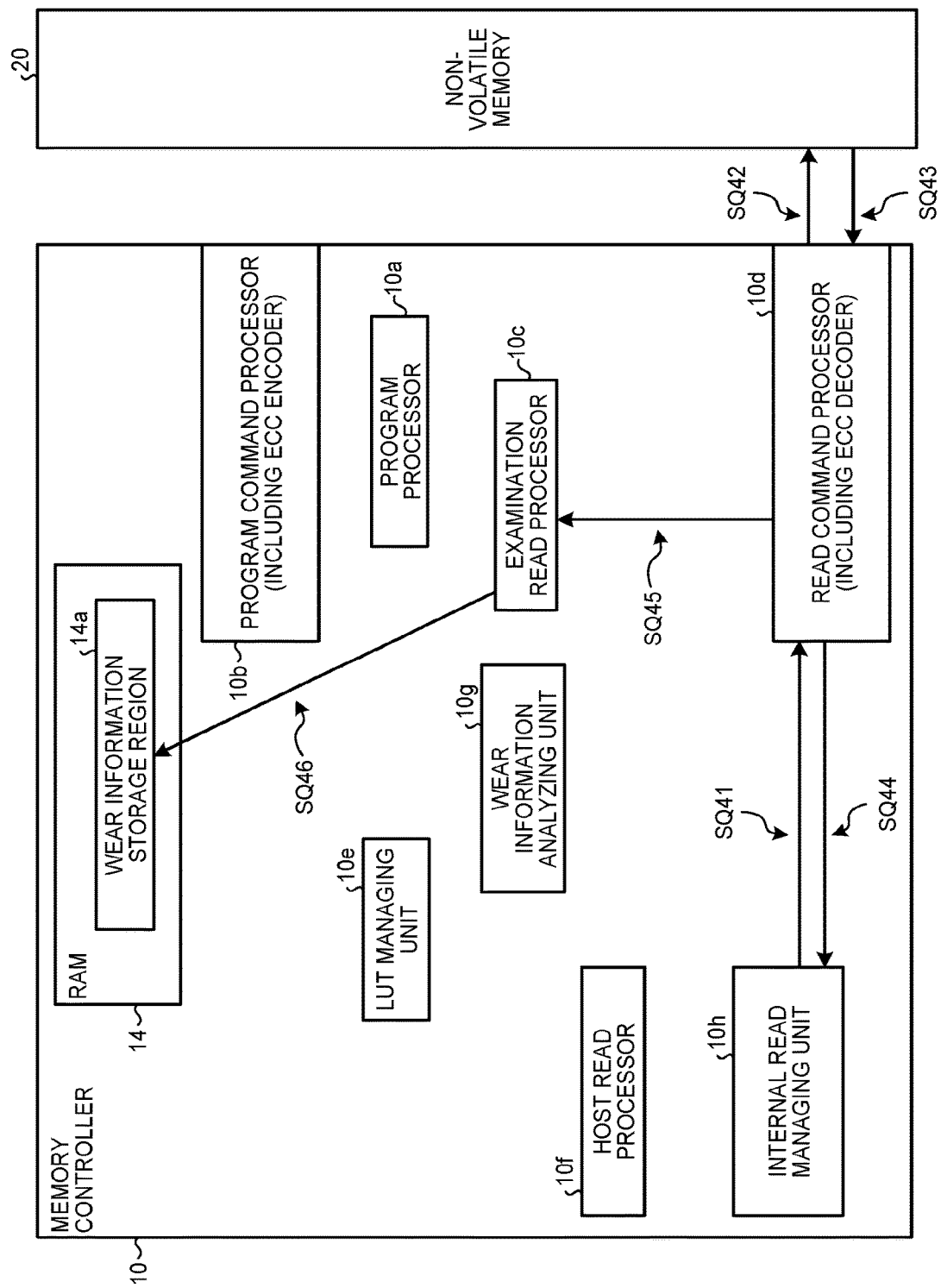
FIG. 12 is a dataflow diagram illustrating the detailed operation of the memory system according to the modified example of the embodiment.

The examination read processing (ST1) may be implemented as illustrated in FIGS. 11 and 12. FIG. 11 is a flowchart illustrating a detailed operation (another example of implementation of the examination read processing) of the memory system according to a modified example of the embodiment. FIG. 12 is a dataflow diagram illustrating the detailed operation of the memory system according to the modified example of the embodiment. FIGS. 11 and 12 illustrate a case where the internal processing (internal read processing) serves as the examination read processing.

As illustrated in FIG. 11, in the memory system 1, the memory controller 10 starts the internal processing when it is determined that the internal processing needs to be performed (ST41), and performs the examination read processing (ST1b).

In the examination read processing (ST1b), the memory controller 10 issues, to the non-volatile memory 20, the examination read command specifying a region on which the read operation according to the internal processing needs to be performed as a target region (ST42). That is, the memory controller 10 may issue, to the non-volatile memory 20, the examination read command which combines the read instruction for examining a wear state of a memory cell and the read instruction according to the internal processing.

When read data is received as a response to the examination read command from the non-volatile memory 20, the memory controller 10 performs error correction on the read data and acquires information on the error correction of the read data.

That is, the memory controller 10 acquires the read data after the error correction and the information on the error correction of the read data as an internal read result, and performs a predetermined internal processing according to the internal read result (ST43). For example, in a case where the internal processing is the ReadVerify, the memory controller 10 checks whether or not a read error occurs (that is, whether or not a bit error is detected by the error correction of the read data). In a case where internal processing is the patrol reading, the memory controller 10 evaluates a bit error ratio in the target region (for example, attempts to perform error correction by performing the patrol reading) to select a block to be subjected to the refreshing.

In addition, the memory controller 10 acquires the number of read clusters and the number of retry-occurred clusters, or the FBC information, as the information on the error correction of the read data, generates or updates the wear information 14a1 based on the acquired information, and stores the wear information 14a1 in the wear information storage region 14a in the RAM 14 (ST44).

The internal read managing unit 10h illustrated in FIG. 12, for example, supplies an internal read request to the read command processor 10d (SQ41). The read command processor 10d issues a read command (SQ42) to the non-volatile memory 20 in response to the internal read command.

Then, the non-volatile memory 20 performs the read operation on a region specified in the read command. When the read operation is completed, the non-volatile memory 20 returns the read data to the read command processor 10d (SQ43).

When the read data is received from the non-volatile memory 20 as a response to the examination read command, the read command processor 10d performs error correction on the read data and returns the read data and an ECC correction result, or the FBC information to the internal read managing unit 10h (SQ44).

Further, the read command processor 10d supplies the ECC correction result or the FBC information to the examination read processor 10c (SQ45). The examination read processor 10c generates the wear information 14a1 according to a read amount, the number of times of retry, and the FBC information, and stores the wear information 14a1 in the wear information storage region 14a in the RAM (SQ46).

In addition, the initial read processing (ST3) may be performed as a command of the read instruction according to the internal processing, instead of being performed according to a host read command received from the host. The internal processing may include the examination for detecting a defect that is not detected by the verifying operation in the write processing, or the examination of a data retention state of a memory cell.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory; and
a controller configured to:
   issue a second read command to the non-volatile memory after writing first data to the non-volatile memory before receiving, from a host, a read request to read the first data from the non-volatile memory;
   select, based on information on error correction of the first data read from the non-volatile memory according to the second read command, one read method from a plurality of read methods with different time required to read the first data from the non-volatile memory, the selected one read method being to be executed by the non-volatile memory in response to an initial read command in a retriable read sequence to read the first data corresponding to the read request from the host; and
   issue a first read command, as the initial read command, to read the first data according to the selected one read method to the non-volatile memory.

2. The memory system according to claim 1, wherein the controller is configured to issue the second read command as a command which is not associated with the read request from the host.

3. The memory system according to claim 1, wherein the controller is configured to issue, within a predetermined time after writing the first data to a region of the non-volatile memory is completed, the second read command specifying the region.

4. The memory system according to claim 1, wherein the controller is configured to issue the second read command to the non-volatile memory on a predetermined interval or when the memory system is in an idle state.

5. The memory system according to claim 1, wherein the controller is configured to issue the second read command to the non-volatile memory after writing the first data to a region of the non-volatile memory is completed before address conversion information is updated resulting from the writing of the first data.

6. The memory system according to claim 1, wherein
the plurality of read methods includes
   a first read method in which a first time is required to read the first data from the non-volatile memory, and
   a second read method in which a second time longer than the first time is required to read the first data from the non-volatile memory, and the controller is configured to:
   select the first read method from the plurality of read methods in a case where the information on the error correction of the first data indicates a reliability higher than a first threshold, and
   select the second read method from the plurality of read methods in a case where the information on the error correction of the first data indicates a reliability lower than the first threshold.

7. The memory system according to claim 6, wherein
the plurality of read methods further includes a third read method in which a third time longer than the second time is required to read the first data from the non-volatile memory, and
the controller is further configured to:
   select the second read method from the plurality of read methods in a case where the information on the error correction of the first data indicates a reliability between the first threshold and a second threshold lower than the first threshold, and
   select the third read method from the plurality of read methods in a case where the information on the error correction of the first data indicates a reliability lower than the second threshold.

8. The memory system according to claim 1, wherein the information on the error correction includes at least one of a bit error ratio detected by the error correction of the first data, and a retry ratio of a read operation to read the first data from the non-volatile memory.

9. The memory system according to claim 1, wherein the controller is connectable to the host and configured to issue, to the non-volatile memory, the second read command as a command which serves to instruct examining a wear state of a memory cell and to instruct a read operation according to the read request.

10. The memory system according to claim 1, wherein the controller is configured to issue, to the non-volatile memory, the second read command as a command which serves to instruct examining a wear state of a memory cell and to instruct a read operation according to an internal processing.

11. The memory system according to claim 10, wherein the internal processing includes an examination to detect a defect that is not detected by a verifying operation in a write processing, or an examination of a data retention state of the memory cell.

12. The memory system according to claim 1, wherein the controller is further configured to select one read method from the plurality of read methods based on a number of clusters of the first data read from the non-volatile memory according to the second read command and the information on the error correction of the first data.

13. The memory system according to claim 12, wherein the plurality of read methods includes
   a first read method in which a first time is required to read the first data from on the non-volatile memory, and
   a second read method in which a second time longer than the first time is required to read the first data from on the non-volatile memory, and
   the controller is configured to:
      select the first read method from the plurality of read methods in a case where the number of clusters of the first data is less than a predetermined number,
      select the first read method from the plurality of read methods in a case where the number of clusters of the first data is equal to or more than the predetermined number and the information on the error correction of the first data indicates a reliability higher than a first threshold, and
      select the second read method from the plurality of read methods in a case where the number of clusters of the first data is equal to or more than the predetermined number and the information on the error correction of the first data indicates a reliability lower than the first threshold.

14. A method of controlling a non-volatile memory, comprising:
   issuing a second read command to the non-volatile memory after writing first data to the non-volatile memory before receiving, from a host, a read request to read the first data from the non-volatile memory;
   selecting, based on information on error correction of the first data read from the non-volatile memory according to the second read command, one read method from a plurality of read methods which are different from each other in regard to a time required to read the first data from on the non-volatile memory, the selected one read method being to be executed by the non-volatile memory in response to an initial read command in a retriable read sequence to read the first data corresponding to the read request from the host; and
   issuing a first read command, as the initial read command, to read the first data according to the selected one read method to the non-volatile memory.

15. The method according to claim 14, wherein the second read command is issued within a predetermined time after writing the first data to a region of the non-volatile memory is completed, the second read command specifying the region.

16. The method according to claim 14, wherein the second read command is issued to the non-volatile memory on a predetermined interval or when the non-volatile memory is in an idle state.

17. The method according to claim 14, wherein the second read command is issued to the non-volatile memory after writing the first data to a region of the non-volatile memory is completed before address conversion information is updated resulting from the writing of the first data to.

18. The method according to claim 14, wherein
   the plurality of read methods includes
      a first read method in which a first time is required to read the first data from the non-volatile memory, and
      a second read method in which a second time longer than the first time is required to read the first data from the non-volatile memory, and
   the selecting of the one read method includes:
      selecting the first read method from the plurality of read methods in a case where the information on the error correction of the first data indicates a reliability higher than a first threshold, and
      selecting the second read method from the plurality of read methods in a case where the information on the error correction of the first data indicates a reliability lower than the first threshold.

19. The method according to claim 14, wherein
   the issuing of the second read command includes issuing, to the non-volatile memory, the second read command as a command which serves to instruct examining a wear state of a memory cell and to instruct a read operation according to an internal processing, and
   the internal processing includes an examination to detect a defect that is not detected by a verifying operation in a write processing, or an examination of a data retention state of the memory cell.

20. The method according to claim 14, wherein the selecting of the one read method includes selecting the one read method from the plurality of read methods based on a number of clusters of the first data read from the non-volatile memory according to the second read command and the information on the error correction of the first data.

* * * * *